Dec. 13, 1938.     G. A. COLLENDER     2,139,937
LAND VEHICLE
Filed Aug. 22, 1936     4 Sheets-Sheet 1

INVENTOR.
GUSTAVE A. COLLENDER
BY Joseph F. Westall
ATTORNEY.

Dec. 13, 1938.  G. A. COLLENDER  2,139,937
LAND VEHICLE
Filed Aug. 22, 1936  4 Sheets-Sheet 2

INVENTOR.
GUSTAVE A. COLLENDER
BY Joseph F. Westall
ATTORNEY.

Dec. 13, 1938.    G. A. COLLENDER    2,139,937
LAND VEHICLE
Filed Aug. 22, 1936    4 Sheets-Sheet 3
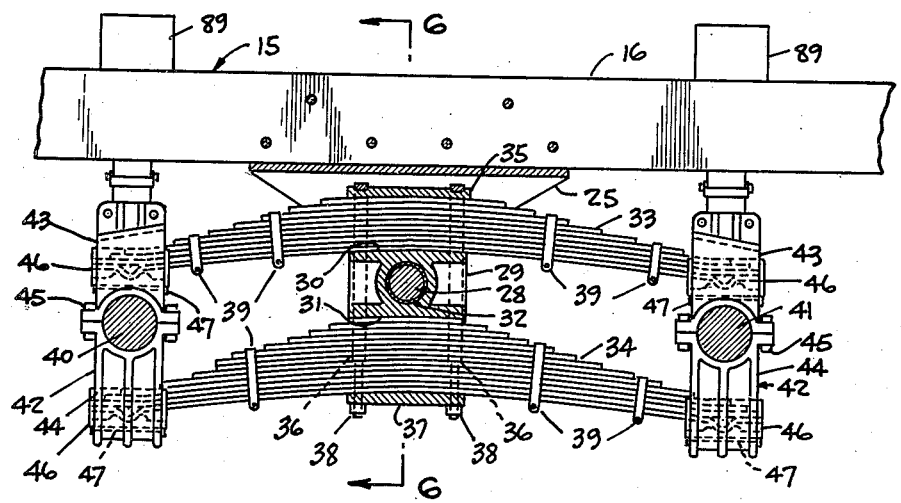
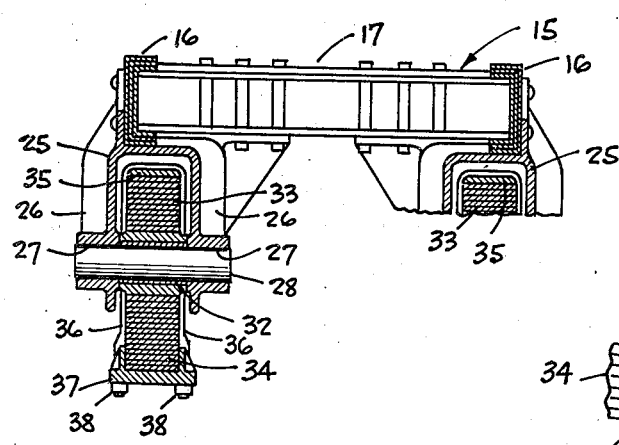
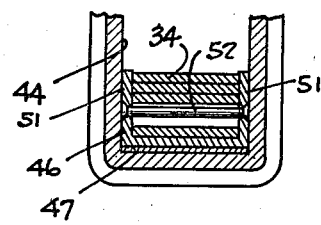
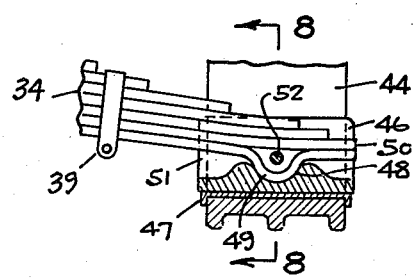
INVENTOR.
GUSTAVE A. COLLENDER
BY Joseph F. Westall
ATTORNEY.

Dec. 13, 1938.                G. A. COLLENDER                2,139,937
                                LAND VEHICLE
                            Filed Aug. 22, 1936           4 Sheets-Sheet 4
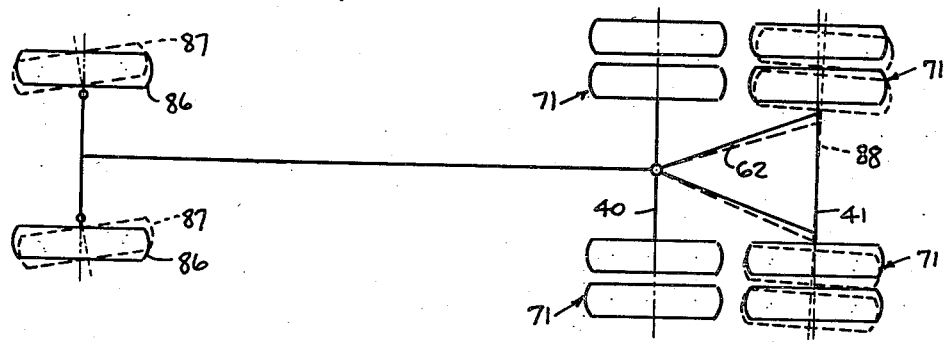
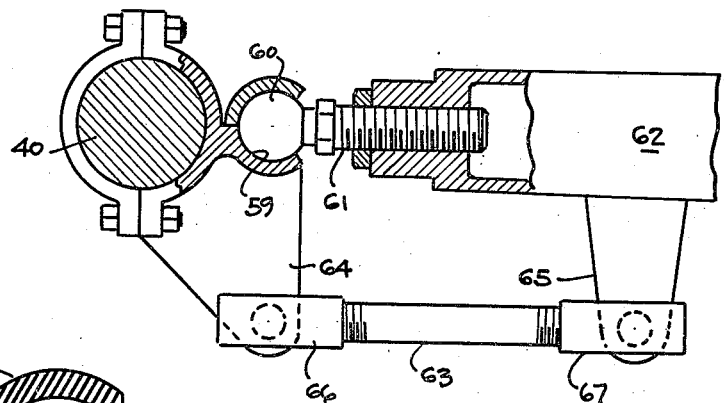
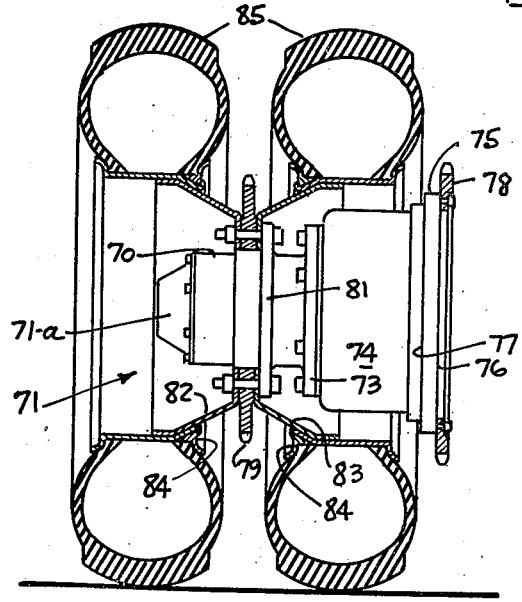
INVENTOR.
GUSTAVE A. COLLENDER
BY Joseph F. Westall
ATTORNEY.

Patented Dec. 13, 1938

2,139,937

UNITED STATES PATENT OFFICE 2,139,937

LAND VEHICLE

Gustave A. Collender, Los Angeles, Calif.

Application August 22, 1936, Serial No. 97,413

13 Claims. (Cl. 180—22)

This invention relates generally to land vehicles and specifically contemplates improvements in running gear embodying traction units of four or more wheels, to which six wheel trucks of the prior art are particularly adapted.

Truck transportation of exceptionally heavy loads carried by pneumatic tired vehicles presents problems of distribution of weight uniformly to each load carrying wheel under all road conditions normally encountered in excavating, logging and mining operations. In these classes of operation there is frequent need for added traction beyond the tractive effort of one pair of driven road wheels, particularly when operating in loose sand, snow or icy roads, in mud or on steep slippery grades. To meet these emergencies it is necessary to provide an auxiliary drive that can be easily attached and detached from the main driven road wheels to the trailing axle. Such a device has been found to be most desirable for use in connection with vehicles operating under average conditions, where only a fraction of the mileage covered requires four wheel traction power and the greater portion of the time sufficient traction is obtained with the usual one axle, or two wheel drive.

To accomplish the desired results in units utilizing a roller link chain as a means of connecting the main driving wheels with the trailing axle wheels by means of sprockets mounted either on the brake drums adjacent to the inside tire and/or by clamping sprockets between the dual wheel discs on each of the four dual wheeled road wheels, certain provisions must be made for compensation of relative speeds of each wheel as vehicle changes its course.

In running gear of the prior art, difficulties have been encountered in attempting to provide the flexibility necessary between the axes of each pair of wheels, whereby each of the wheels may be most efficiently utilized as weight carriers and strain on the chassis minimized when turning or riding road irregularities. When turning, for example, unless the axles of a four wheel traction unit are free to find their own arc, the wheels of only one of the axles will be free to pivot at their point of contact with the road surface; the other set of wheels will be dragged laterally around the curve by the rigidity of their alignment with the pivoting wheels.

It is a principal object of the present invention to provide in a six wheel truck, a four wheel traction unit in which the axles of each pair of wheels are flexibly connected to permit the trailing axle to swing to an angle with respect to the driving axle, and by thus compensating in the trailing wheels for change of direction of the truck, obviating their drag on the road surface.

Another object is the provision of supporting housings connected with each axle for the floating support of the ends of the springs whereby the weight carried by the springs may be resiliently distributed equally between the axles regardless of and without restricting their normal relative flexibility in response to driving conditions.

Another object is to provide a plurality of spring end bearing shoes, each slidably disposed on a wearing plate carried within respective spring housings, and each having a socket for the support of the ends of the springs to receive the full weight resiliently conveyed thereto at their axes, regardless of vertical position of wheel or elongation of the springs thereby equalizing wear and weight distribution.

Another object is to provide a pair of radius rods, parallel in the same vertical plane, between the axles of a four-wheel traction unit to maintain spring blocks carried by the axles substantially parallel with respect to each other, and perpendicular to a plane through and parallel to the axles during all stages of normal operation.

Another object is to provide a series of vertical springs attached to each axle, the upper ends of the springs being adapted to bear against suitable wearing plates on inside of frame members, thereby giving lateral support to axles to prevent side sway with top heavy loads, and assisting in shifting the axles laterally when turning curves to relieve excessive strain on the main spring pivot bearings. This is of particular importance when using extremely large tires which cover a great area of road surface, which necessitates greater axle spacing.

Other objects and corresponding advantages will be apparent to those of skill in this art upon an examination of the following description read in the light of the accompanying drawings, in which—

Fig. 5 is a broken elevation of the rear end of the frame illustrating one set of springs and the mountings therefor;

Fig. 6 is a section on lines 6—6 of Fig. 5;

Fig. 7 is an enlarged detailed elevation, partially broken away, of the shoe of my invention for supporting the ends of the springs;

Figs. 8 and 9 are sectional views taken on correspondingly-numbered lines of Figs. 7 and 3, respectively;

Fig. 10 is a sectional view of a modified form of wheel structure having the sprocket of chain driving mechanism incorporated therewith;

Fig. 11 is a diagrammatic view of the arrangement of the truck wheels and rear radius rod illustrating in dotted lines the operation of the rear wheels and axle when turning to the left.

Figure 1:
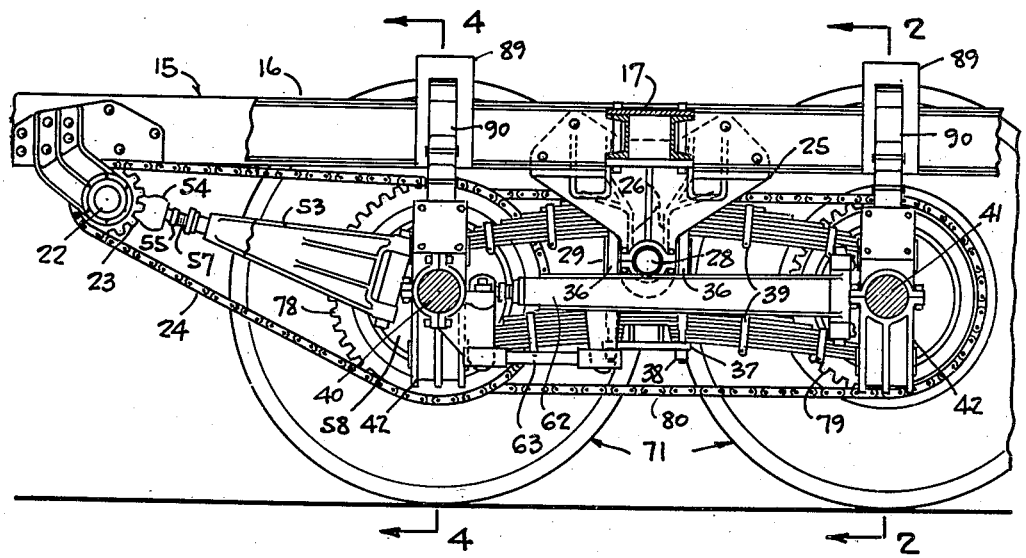
Fig. 1 is a sectional view of the rear end of a six wheel truck embodying my invention.
Figure 2:
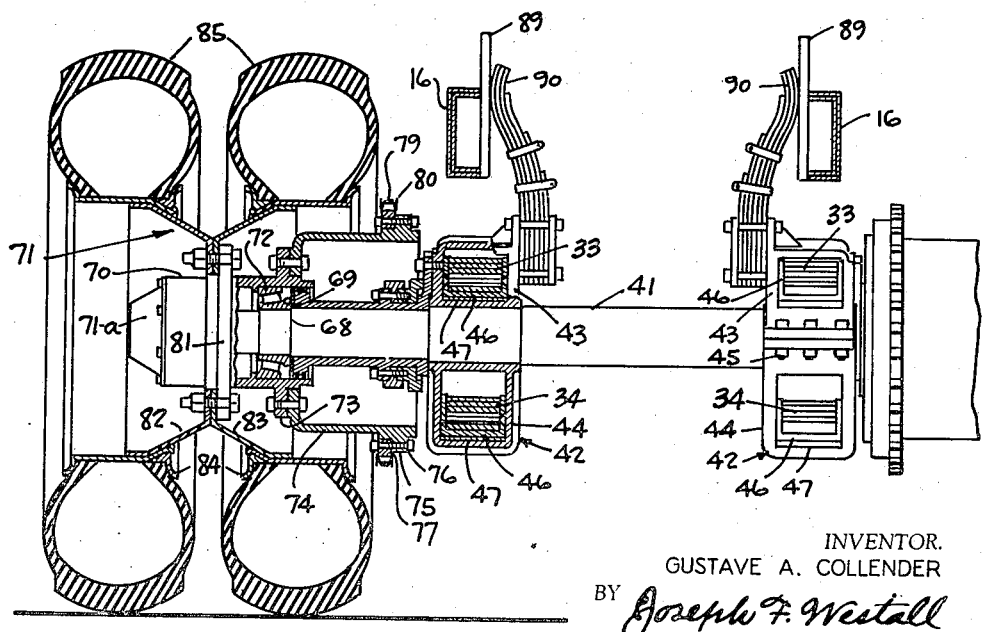
Fig. 2 is a section on lines 2—2 of Fig. 1.
Figure 3:
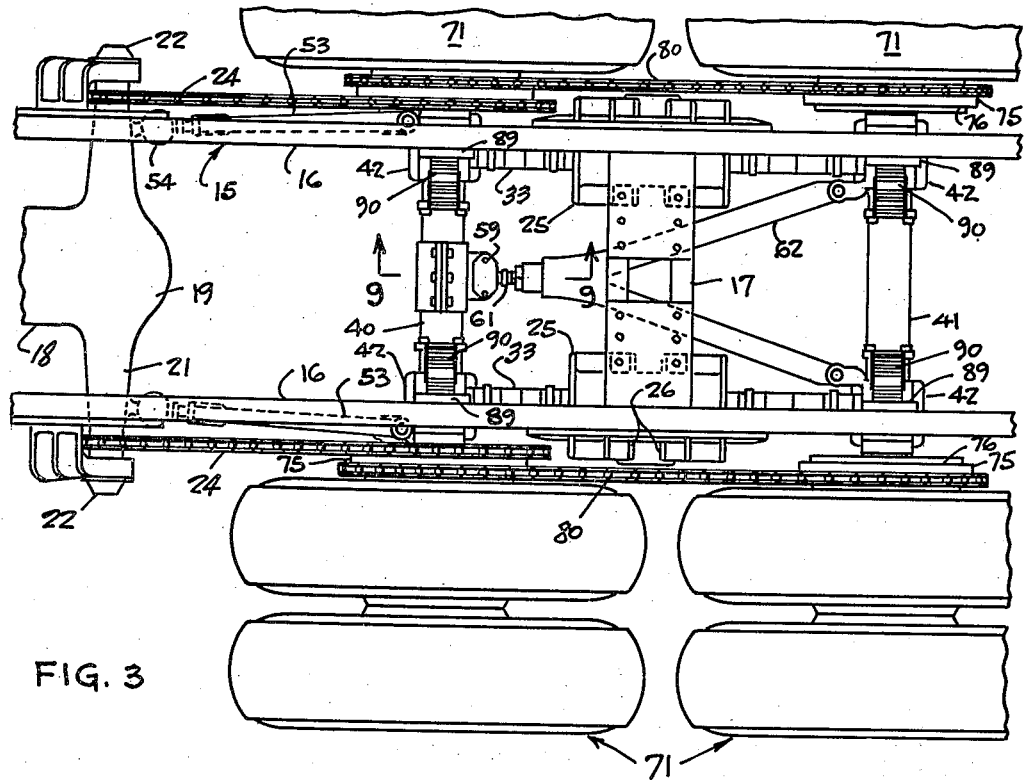
Fig. 3 is a top plan view of the four wheel traction unit shown in Fig. 1.
Figure 4:
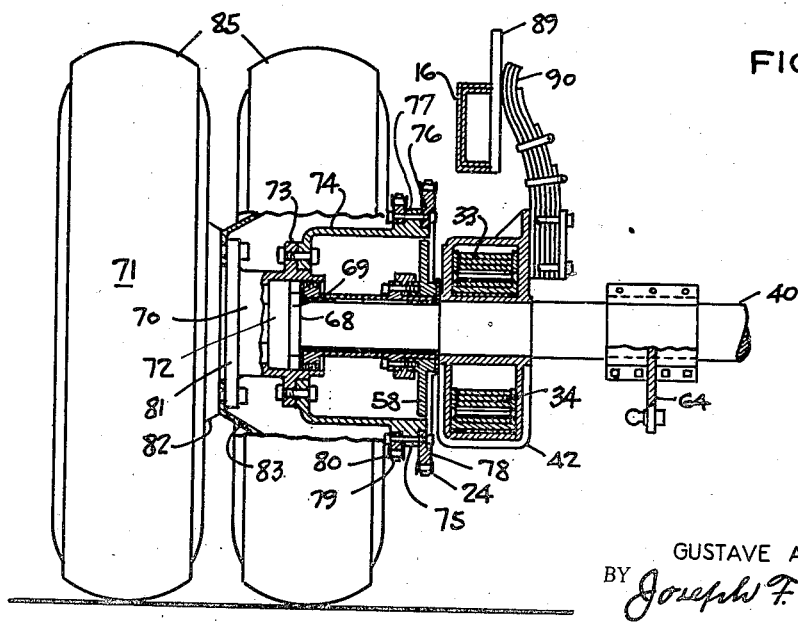
Fig. 4 is a sectional view taken on lines 4—4 of Fig. 1.

Referring to the drawings in detail, the numerals of which indicate similar parts throughout the several views, 15 designates generally the rear end of the frame of a six wheel truck, comprising a pair of longitudinal, parallel girders 16 and a cross-beam 17. A conventional drive-shaft housing 18 forward of beam 17 terminates in the usual differential housing 19. A jack shaft comprising a pair of aligned differentially driven shaft sections inclosed in a housing 21 and hence not seen in the drawings, having its outer ends extending through the frame and journalled in bearings 22 carried by girders 16, is connected with a power source through the differential. Sprockets 23 are secured to the jack shaft adjacent each end intermediate the bearings 22 and the frame, by which the foremost of two pairs of rear traction wheels of the truck are driven by chains 24 as hereinafter more in detail described.

A main spring bracket 25 is welded, riveted, or otherwise secured to each side of the frame and extends therebelow intermediate the position of the two pairs of wheels, above noted. The lower portion of each bracket 25 is cast to provide downwardly-extending parallel flanges 26, in which bearings 27 for transverse spring trunnions 28 are formed. A yoke 29, encircling each trunnion 28 (Fig. 5) has upper and lower outside surfaces 30 and 31, slightly convex and concave, respectively. 32 indicates bushings between trunnions 28 and yokes 29. Against upper and lower surfaces 30 and 31 of each yoke the middle portions of two pyramidically-arranged conventional spring piles 33 and 34, respectively, are held by means of a top plate 35, having four retaining legs 36 extending downwardly on opposite sides of the trunnion and springs. A seat 37 under the lower spring pile supports the lower spring, being clamped with top plate 35 by bolts 38, threaded into legs 36. Around each of the four composite springs a plurality of clips 39 are provided for a purpose well known in the art.

A dead axle 40, extending transversely below the frame and between the forward ends of both vertically aligned pairs of springs, is hereinafter referred to as the driving axle. In embodiments in which the wheels carried by this driving axle are directly motivated by the drive shaft through the differential a live axle may be substituted without departing from the spirit of my invention as will be obvious to those of skill in this art.

Rearward of axle 40 at the ends of the springs 33 and 34 a second dead axle 41 is disposed, hereinafter referred to as the trailing axle. At opposite sides of each of the axles 40 and 41, substantially in vertical alignment with respective frame girders 16, a spring block 42 is mounted which consists of a pair of flat-bottomed open-ended housings 43 and 44, vertically arranged above and below the axle respectively. The housings of each spring block extend half way around the axle where adjacent edges are flanged for their relative attachment by bolts, as indicated at 45.

Opposite ends of upper and lower springs 33 and 34 (Figs. 7 and 8) extend into aligned housings 43 and 44, respectively. A shoe 46, about to be described in detail, is pivotally carried by each end of each spring pile and is slidably supported on a wearing plate 47 secured in each housing. The shoes 46 are flat on their bottoms to correspond with the surface of wearing plates 47 and furnish a relatively broad bearing area. In the upper surface of each shoe a U-shaped channel 48 is formed, at right angles to the springs. The under side of opposite ends of the lower leaves of each spring are curved to conform to the shape of channels 48, forming a rounded bearing 49, through which the weight carried by the spring is conveyed to the shoes. An insert 50 between the curved portion of each of the lower leaves and its adjacent leaf reinforces bearing 49. The sides of the spring leaves extending into the housings are protected from frictional contact with the housings by walls 51 of shoes 46. Each shoe is held in pivotal relation, against displacement, with respect to the spring ends by a bolt 52 extending through the walls 51 of the shoes and inserts 50.

A radius rod 53 is swivelled to each side of the jack shaft housing 21 by means comprising a ball socket 54 secured to the housing, and a turnbuckle 55 having a ball, not visible but of obvious design, adapted to swivel in socket 54, and a threaded connection 57 with the rod 53. The opposite end of each rod is pivoted by well known means to a brake spider 58 rotatably encircling the driving axle 40 within a brake drum later referred to. It will be apparent that while the driving axle will be free to move both laterally and vertically as well as tilt with respect to the frame, it will be maintained in parallel alignment with the jack shaft by means of radius rods 53 through which the drive thrust of the wheels, carried by axle 40, is exerted. The wheels of trailing axle 41, also furnishing a tractive impulse, are connected to the driving axle by means about to be described.

At the middle of the driving axle a ball socket 59 is clamped, in which the ball 60 of a ball-screw 61 is swivelled. The opposite end of the ball-screw is threaded into the apex of a V-shaped radius rod 62 having its diverged ends pivotally connected to the trailing axle adjacent the rear spring blocks 42. Rotation of the ball-screw will vary the proximity of the rear axle with respect to the driving axle, in a manner well known in the art for a purpose hereinafter referred to. Radius rod 62 will thus permit the trailing axle to swing freely from the middle of axle 40, which movement will be limited by the resistance of springs 33 and 34, to enable the drive thrust of the wheels of axle 41 to be directed through said rod 62.

The torque applied to the trailing axle, resulting from its vertical motion in the arc determined by radius rod 62 as the wheels pass over irregularities in the road surface, as well as from the braking action, is equally distributed between the axles to maintain spring blocks 42 relatively parallel, by a composite sub-radius rod 63 (Fig. 9) swivelled between downwardly-extending members 64 and 65, integrally cast, and in vertical alignment with, respectively, ball socket 59 and the radius rod 62. The sub-radius rod 63 comprises a bar equipped at opposite ends with right and left hand threads for attachment of its swivelled connections 66 and 67 permitting its rotation to vary the distance between members 64 and 65 and thereby compensate for variances in the length of radius rod 62 by adjustment of the ball-screw 61.

The ends of each of the axles are reduced in diameter to form outwardly-directed annular shoulders 68 against each of which a wheel bearing cone 69 is mounted. The hub 70 of a wheel generally indicated by the numeral 71 forms a wheel bearing cup 72 in which the cone is operatively retained. Hubs 70 are maintained in position by similar bearing cones and nuts (not shown) at the outer end of the axles within hub caps 71a, as will be obvious to those of skill in this art without further description. To a peripheral flange 73, integrally formed with each of hubs 70, a brake drum 74 is bolted. The internal structure of the brake, not being a part of this invention, is not further described.

A flange 75 on the periphery of each brake drum 74 provides oppositely-directed annular shoulders 76 and 77. Against the inner shoulder 76 of each of the drums 74, carried by the driving axle, which shoulder is normally in parallel alignment with sprockets 23 of the jack shaft, a drive sprocket 78, larger than sprockets 23, is disposed. Endless drive chains 24 connect sprockets 78 with aligned sprockets 23 of the jack shaft. A smaller sprocket 79 is located against the other shoulder 77 of each of the four drums, which with one of sprockets 78 on drums of the driving axle, are bolted to respective flanges 75. Sprockets 79 on the respective sides of the frame are similarly connected by chains 80.

Each wheel 71 comprises in addition to the hub 70, a flange 81, integral with the hub to which diverging annular disks 82 and 83 are bolted. On the ends of each of disks 82 and 83 a rim 84 is riveted or welded. Pneumatic tires 85 are removably mounted in a well known manner on each rim.

In a modified form of my invention (Fig. 10) sprockets 79 are clamped between the disks to flanges 81, which make them more easily accessible for inspection, adjustment, repair, and replacement.

An important advantage in the operation of this invention is illustrated diagrammatically in Fig. 11. As above noted, the driving axle is maintained perpendicular to the longitudinal axis of the chassis by radius rods 53. When rounding a turn, with the front wheels 86 of the truck assuming the position indicated by dotted lines 87, the wheels of the driving axle will travel on the road surface in substantially the same manner as the rear wheels of a conventional four-wheel vehicle. The portion of the truck in back of the driving axle will swing laterally in an arc, the center of which is the middle of the driving axle, and the rearmost wheels therefore will track approximately about a point located in a plane passed vertically through the axes of the foremost drive wheels. Due to the swivelled connection of radius rod 62, the trailing axle is free to swing to an angle with respect to the driving axle in exact proportion to the angle of the steered front wheels, as indicated in dotted lines 88, in Fig. 11, and permits the wheels carried thereby to roll in the respective arcs in which the wheels of axle 40 travel. It will be apparent that as the rear wheels of the traction unit move on the same tread travelled by the respective forward wheels on corresponding sides of the chassis, the differential will accommodate the change of speed required by both front and rear aligned wheels when rounding a curve, permitting their drive connection by chains 80, as noted above.

Due to the slidable engagement of the rear ends of the springs 33 and 34 with the vertical walls of housings 43 and 44 which are rigidly attached to the rear axle, angular movement of the axle 41 with respect to the driving axle can only be accommodated by the twisting of the springs. The resilient resistance of the springs to the torque imposed by the action of axle 41 in assuming a position other than parallel with axle 40 prevents objectionable lateral oscillation of the rear wheel assembly.

Each wheel of the traction unit will carry its full load under all normal operating strains due to the extreme flexibility of the unit axles, it being obvious that radius rod 62 will permit relative vertical tilting of the axles to any degree in response to road irregularities. However, as the springs are rigidly secured at their middle and have their ends snugly engaging the walls and bottom of each spring housing, tilting of either axle with respect to the frame imposes a twisting strain on the springs. To offset excessive strain resulting from the torque imposed by abnormal operation, a bearing plate 89 is secured parallel to the frame girders 16, so as to extend vertically above each spring block 42. A composite spring 90, comprising a plurality of leaves, is bolted at its lower end to each spring block in approximate alignment with plate 89 and extends vertically upward so as to bear against the face of the bearing plate 89. Tilting of either axle will accordingly be resiliently resisted by the contact and flexing of the spring 90 disposed at the low end of the axle being tilted against its respective bearing plate.

While I have described and illustrated a preferred embodiment of my invention, it will be obvious to those of skill in this art that numerous modifications embodying the principles set forth, may be made, such, for example, as in the number of springs; single wheels may be substituted for the double wheels shown; also spoke-type dual wheels with demountable rims may be substituted for dual disks shown; either or both sets of wheels of the traction unit may be driven by gear mechanism from the differential through live axles, conventional type axle housings being employed for support of spring blocks and brake structure; a unitary spring trunnion may displace the separately journalled individual trunnions 28; the pair of vertical springs attached to each axle to relieve torque of the weight-carrying springs may be bolted together and mounted in the middle of the axles, or each spring may be designed in specific embodiments to bear against plates on either side thereof, and that various changes may be made in relative size, number, design and proportion of the parts,—all without departing from the spirit of my invention as defined in the appended claims.

What I claim and desire to secure by Letters Patent is:

1. In a truck chassis, a frame, relatively parallel springs suspended from said frame, a driving axle connected to the forward ends of said springs, a trailing axle connected to the rear ends of said springs, radius rods jointly swivelled to the middle of the driving axle having their ends connected to opposite ends of the trailing axle by means including vertical pivots offset forwardly from said trailing axle, wheels rotatably carried by each axle, and drive chains connected from the wheels of the driving axle to the wheels of the trailing axle.

2. In a truck chassis, a driving axle and a trailing axle, a diverging radius rod swivelled at its apex to the middle of the driving axle and having its diverged ends pivoted to opposite sides of the trailing axle, projections rigidly carried by said radius rod and driving axle, respectively, and a sub-radius rod, parallel to said diverging radius rod, having its ends swivelled to said projections.

3. In a truck chassis, a frame, a driving axle and a trailing axle, wheels carried by each of said axles, suspension means permitting the trailing axle to be adjusted longitudinally of the frame, a diverging radius rod having its outer ends connected to opposite ends of said trailing axle, a turnbuckle comprising a member having a ball at one end, its other end being threadedly connected with the apex of said radius rod for longitudinal adjustment with respect thereto, and a ball socket rigidly supported by said driving axle to retain said ball therein.

4. In a truck chassis, a frame, an axle below said frame, a spring connected to said frame, a spring block carried by said axle in alignment with said spring, a shoe supported by said spring block adapted to slidably reciprocate therewith in a direction parallel to said spring, a curved channel in the upper surface of said shoe, a bearing corresponding to the curvature of said channel on the underside of said spring, and means to retain said channel and bearing in pivotal contact.

5. In a truck chassis, a frame, a driving axle and a trailing axle, a wheel carried at the end of each of said axles, a brake spider rotatably carried by the driving axle adjacent each wheel, radius rods swivelled to opposite sides of the frame having their ends pivoted to respectively aligned brake spiders, a diverging radius rod swivelled to the middle of said driving axle and having its diverged ends connected to opposite ends of said trailing axle, a pair of vertical projections mounted to said driving axle and radius rod, respectively, and a sub-radius rod, parallel to said diverging radius rod and, swivelled to said projections.

6. In a vehicle comprising a framework and a wheel-carrying axle disposed below a portion of said framework, a pair of longitudinally arranged leaf springs extending to said axle from the respective sides of the framework, a pair of box-like members secured to said axle adjacent the spring ends to receive the latter, a pair of vertical leaf springs each rigidly secured at one end to one of said box-like members and projecting upwardly toward said framework portion, and said portion having a pair of substantially flat vertical surfaces contacting the upwardly projecting ends of said vertical springs, the latter and said surfaces being so related as to tend to maintain said axle perpendicular to the longitudinal axis of the framework.

7. In a vehicle comprising a framework and an axle disposed beneath a portion of said framework, wheels supporting said axle and sprockets connected to said wheels, driving chains passing around said sprockets and extending away therefrom in substantial parallelism with a vertical plane taken longitudinally through the axis of the vehicle, suspension mechanism connecting said axle to the vehicle with limited capacity for axial movement laterally of the vehicle, and a plurality of upright leaf springs extending between the axle and the framework with their leaves arranged in planes substantially parallel to the planes of said driving chains, said axle and framework having a pair of connections with each of said upright springs to cause the latter always to resist tilting and axial movement of the axle, one of said connections comprising a rigid joint and the other comprising means affording a vertical surface parallel to and in sliding contact with the spring, whereby said sprockets and chains are constantly urged toward parallelism with said vertical longitudinal plane.

8. In a multi-wheel vehicle comprising a framework and a pair of tandem axles arranged beneath a portion of said framework, a set of driven wheels supporting the ends of one of said axles; a second set of wheels supporting the other axle; sprockets rotatable with the sets of wheels and driving chains extending around said sprockets, all substantially in planes parallel to a vertical plane passed through the longitudinal axis of the vehicle; a flexible suspension assembly connecting said axles to the framework; and a plurality of leaf springs secured to said axles with their leaves arranged in substantially vertical planes passing longitudinally of the vehicle, and means on said framework affording flat vertical surfaces parallel to and in sliding engagement with said leaves whereby both axles have their tendencies to tilt and shift axially yieldingly resisted and said chains are urged toward parallelism with said vertical plane taken axially of the vehicle.

9. In a multi-wheel vehicle, a framework comprising a pair of longitudinal side members, a pair of tandem axles disposed below said side members with their ends projecting laterally beyond the latter, wheels at the outer sides of said members for supporting said axle ends, said wheels being slightly spaced outwardly from the side members and having sprockets disposed in the spaces thus formed, chains disposed in said spaces and passed around the sprockets, longitudinal suspension beams connected to the framework and disposed directly below said side members and interconnecting the axles, and substantially vertical leaf springs extending downwardly from the inner sides of said side members to said axles.

10. In a truck chassis, a frame, an axle below said frame, a leaf spring connected to the frame and having a curved pivotal portion disposed laterally of its end adjacent the axle, a shoe supported by the axle and receiving said spring end, said shoe having a curved pivotal portion complemental to the first mentioned pivotal portion, and means for retaining said pivotal portions in complemental engagement.

11. In the apparatus defined in claim 10, said pivotal portion on the spring comprising an approximately semi-cylindrical bend in one of the spring leaves, said shoe having walls adjacent the edges of the spring leaves, and said retaining means comprising a pin passed through said bend into said walls of the shoe.

12. In a vehicle comprising a frame and a set of transversely disposed axles beneath said frame, a torque and radius rod assembly comprising a bracket secured to one of said axles, an elongated rod universally connected to said bracket and extending away therefrom for connection with another part of the vehicle, a short rod pivotally connected at one end to said bracket at a point materially offset from said universal connection, said short rod being substantially parallel to said elongated rod and in substantially the same vertical plane, and means joining the other end of said short rod with the body of said elongated rod, said means comprising a pivotal connection and constructed to prevent relative axial movement of the two rods.

13. In the combination defined in claim 12, said bracket, rods and joining means forming a parallelogram, and said rods including means for individually adjusting them in length to vary the magnitude of two of the sides of the parallelogram.

GUSTAVE A. COLLENDER.